United States Patent
Laserson et al.

[11] Patent Number: 5,860,273
[45] Date of Patent: Jan. 19, 1999

[54] COMPLIANT ENGAGEMENT MEMBER WITH FLEXIBLE COUPLING FOR USE WITH TREE-SHAKING APPARATUS

[75] Inventors: Matti Laserson, Golden Beach, Fla.; Eitan Zehavi, 12 Alonim Street, Kiriat Tivon, Israel

[73] Assignee: Eitan Zehavi, Kiriat Tivon, Israel

[21] Appl. No.: 587,691

[22] Filed: Jan. 17, 1996

[51] Int. Cl.⁶ ............................................ A01D 46/26
[52] U.S. Cl. ................................. 56/340.1; 56/DIG. 2
[58] Field of Search ................ 56/340.1, DIG. 2, 56/327.1, 328.1

[56] References Cited

U.S. PATENT DOCUMENTS

| | | |
|---|---|---|
| 3,163,458 | 12/1964 | Brandt, Jr. . |
| 3,318,629 | 5/1967 | Brandt, Jr. . |
| 3,335,556 | 8/1967 | Edgemond, Jr. . |
| 3,338,040 | 8/1967 | Shipley, Jr. . |
| 3,479,806 | 11/1969 | Stuart . |
| 3,548,578 | 12/1970 | Shipley, Jr. . |
| 3,656,283 | 4/1972 | Shipley ................................. 56/1 |
| 3,762,139 | 10/1973 | Tompkins .......................... 56/328.1 |
| 3,793,815 | 2/1974 | Hughes ............................. 56/328.1 |
| 4,521,468 | 6/1985 | Brandt ................................. 428/35 |
| 4,757,674 | 7/1988 | Compton .......................... 56/340.1 |
| 4,893,458 | 1/1990 | Compton .......................... 56/340.1 |
| 4,921,073 | 5/1990 | Compton .......................... 56/340.1 |
| 5,385,006 | 1/1995 | Compton .......................... 56/340.1 |
| 5,406,780 | 4/1995 | Laserson et al. .................. 56/340.1 |
| 5,467,588 | 11/1995 | Compton .......................... 56/340.1 |
| 5,489,008 | 2/1996 | Hill ................................. 56/340.1 X |

*Primary Examiner*—Terry Lee Melius
*Attorney, Agent, or Firm*—Cesari and McKenna, LLP

[57] ABSTRACT

A compliant engagement member for use with tree-shaking apparatus that resists deformation along the axis of vibration, thereby avoiding dissipation of vibrational energy, yet allows sufficient off-axis deformation to prevent slippage and consequent abrasion of the tree. The engagement member includes a pouch for containing a variable amount of a liquid lubricant; means for conducting a liquid lubricant to and from the pouch; and means for flexibly coupling the pouch to the tree-shaking apparatus. The invention preferably also includes a blanket surrounding at least part of the pouch and frictionally engaging both the pouch and the tree, adding further resistance to slippage against (and consequent injury to) the tree. Lateral inward movement of the shaking device compresses the lubricant pouch against the interior of the contact blanket. The pouch either releases lubricant or is packed sufficiently tightly with lubricant to resist deformation as a result of this compression. However, the pouch and the flexible connections accommodate deformation in the direction transverse to the axis of vibration, thereby absorbing transverse movement and preventing its transmission to the tree. The contact blanket frictionally engages both the pouch and the tree, adding further resistance to slippage against (and consequent injury to) the tree.

23 Claims, 2 Drawing Sheets

COMPLIANT ENGAGEMENT MEMBER WITH FLEXIBLE COUPLING FOR USE WITH TREE-SHAKING APPARATUS

BACKGROUND OF THE INVENTION

1. Field of the Invention

The present invention relates to fruit- and nut-harvesting equipment, and more particularly to a compliant engagement member for use with the heads of tree-shaking apparatus.

2. Description of the Related Art

Mechanical devices for harvesting fruit and nuts from trees typically operate by gripping the tree trunk and imparting thereto a controlled, low-frequency vibration or shaking action. This operation dislodges the fruit or nuts, which are then collected and transported.

A typical tree-shaking apparatus includes two opposing clamp members that engage the tree trunk, and which are themselves driven by dual oscillation units. These units coact to rock the tree laterally. In older devices, the clamps were provided with simple pads that would make direct contact with the tree. This approach, unforunately, resulted in frequent injury to the tree due to abrasion.

To reduce the abrasive effect of pad contact, equipment manufacturers have experimented with various types of deformable engagement pads, such as those described in U.S. Pat. No. 3,318,629. Deformable pads were, for example, filled with a loose packing of granular material, and could therefore fit snugly around a variety of irregularly shaped trees or limbs without excessive local pressures. This type of configuration, while less harmful to the trees, is far less efficient at transmitting vibration than non-deformable pads, since the loosely packed material inherently absorbs vibratory force before it reaches the tree.

Current tree-shaking devices often utilize non-deformable shaker pads that contain associated lubrication arrangements; these avoid tree damage through deliberate slippage within the devices rather than against the trees. An example of this approach appears in U.S. Pat. No. 4,921,073, which describes a shaking head that includes a main shaker pad, a sling that surrounds the pad, and a slip pad that overlies the sling and makes contact on its outer face with the tree. A heat-resistant lubricant or grease is applied between the sling and the slip pad, ensuring that vibration causes the sling to slide across the inner face of the slip pad, while the outer face of the slip pad remains stationary with respect to the tree and therefore does not abrade the bark.

Although externally lubricated arrangements such as this avoid tree damage while preserving adequate transmission of vibration from the oscillation units to the tree, they require cumbersome manual or mechanical systems that replenish the lubricant as it is squeezed out from between the padding layers during operation. Like any forced-fluid device, these mechanical systems require maintenance and are vulnerable, particularly in the vigorous operating environment of a tree-shaking device, to malfunction. Furthermore, because spent lubricant is ejected or falls to the ground during operation, the possibility of environmental contamination must also be considered and prevented.

We disclosed an improvement over these designs in U.S. Pat. No. 5,406,780. Our approach involved a pouch fillable with a lubricant and configured to resist deformation along the axis of vibration, thereby avoiding dissipation of vibrational energy, while allowing sufficient off-axis deformation to prevent slippage and consequent abrasion of the tree. The disclosed engagement member included a shaker pad coupled to the frame of a vibration device; a sealed, lubricant-filled pouch rigidly attached to the pad and frame; and a contact blanket draped over the pouch.

While highly useful under a wide range of conditions, this arrangement has nonetheless been found to exhibit certain limitations. The fact that the pouch is sealed requires a fixed volume of lubricant; as a result, the lubricant may become stale from repeated use, and may also be present in greater quantity than is actually necessary. Furthermore, the contact force between the pouch (via the blanket) and the tree can be controlled only by adjusting the frame; because the frame is a large device not amenable to convenient, precise movement, in practical effect the contact force simply cannot be finely controlled. But insufficient contact between the pouch and the tree prevents efficient transmission of vibratory force and can allow the pouch to strike the tree (risking its injury), while excessive contact force also risks improper operation and injury to the tree.

The rigid connection between the pouch and the frame can also prove problematic. Although the inner surfaces of the pouch are free to slip relative to one another, movement of the frame during vibration can exceed the allowable slippage, with the result that the pouch (again, via the blanket) cannot remain fixed against the tree; instead the pouch drags against the tree, abrading the bark.

DESCRIPTION OF THE INVENTION

Objects of the Invention

Accordingly, it is an object of the present invention to provide a compliant shaking pad that avoids tree damage without the need for free lubricant.

It is a further object of the invention to provide a compliant shaking pad that requires limited or no maintenance.

It is another object of the invention to avoid environmental contamination and expense associated with ejection of lubricant from tree-shaking pads.

Still another object of the invention is to provide a compliant shaking pad that facilitates a variable degree of contact between the shaking pad and a tree.

Yet another object of the invention is to avoid abrasion of the tree during shaking.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

BRIEF SUMMARY OF THE INVENTION

The invention improves over the design disclosed in the '780 patent by replacing the rigid connection between the lubricant-containing pouch and the shaker frame with a flexible connection. This allows a moderate degree of play between the pouch and the shaker to accommodate forces transverse to the axis of vibration, thereby avoiding abrasion to the tree.

The invention also eliminates the concept of a sealed pouch, replacing it with one that may be filled with a varying volume of lubricant fluid. It has been found, for example, that merely lubricating the interior walls of the pouch is ordinarily sufficient to ensure proper operation; it is not necessary to have a large quantity of oil in the pouch. Thus, in one aspect, the invention provides means for introducing lubricant into the pouch prior to shaking (e.g., as the shaker moves between trees), and then allowing most of the lubricant to exit the pouch as the tree is gripped and shaking begins. In this way, only the minimal amount lubricant actually needed is used, and large quantities of lubricant do not reside in the pouch for excessive periods of time.

In another, related aspect, the invention utilizes the ability to selectably fill the pouch to precisely control both the degree of contact with the tree and the degree of pouch filling. In accordance with this aspect of the invention, the frame is moved proximate to the tree so that the pouch is adjacent to or in light contact with the tree. Lubricant is then pumped into the pouch, preferably by a hydraulic piston arrangement, until a desired contact force is achieved. The pouch is then sealed by a check valve to prevent exit of the introduced lubricant during shaking. The invention can be configured to ensure that a minimum amount of liquid is introduced into the pouch to ensure ease of movement between interior surfaces; if the minimum amount of fluid cannot be introduced without exceeding the desired contact force, the frame is withdrawn slightly from the tree.

During harvesting, lateral inward movement of the shaking device compresses the lubricant pouch against the tree (preferably via the contact blanket). The lubricant is largely withdrawn prior to shaking or is packed sufficiently tightly within the pouch so that the pouch resists deformation as a result of this compression. However, the ability of the interior pouch walls to slide relative to one another, combined with the permitted play between the pouch and the shaking device, accommodate deformation transverse to the axis of vibration (thereby absorbing this transverse movement and preventing its transmission to the tree).

The engagement member of the present invention preferably includes a pouch for containing a variable amount of a liquid lubricant; means for conducting a liquid lubricant to and from the pouch; and means for flexibly coupling the pouch to the tree-shaking apparatus. The invention preferably also includes a blanket surrounding at least part of the pouch and frictionally engaging the pouch and, preferably, the tree, adding further resistance to slippage against (and consequent injury to) the tree.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENT

Figure 1:
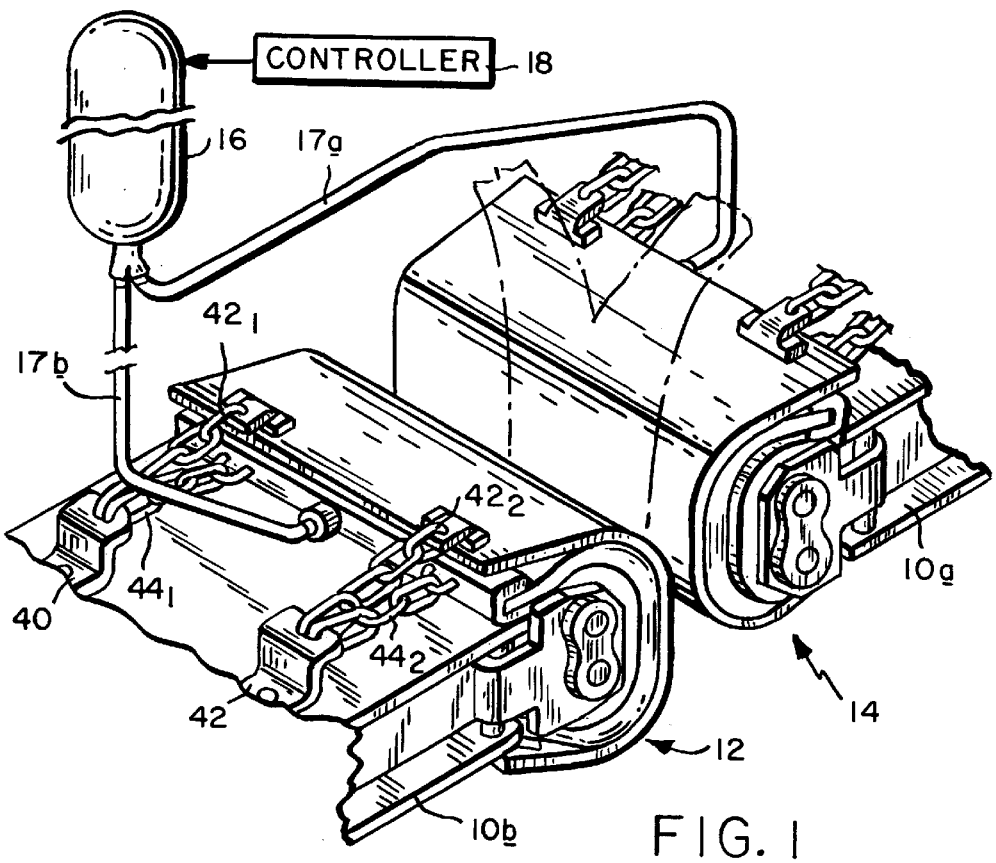
FIG. 1 is an isometric view of two compliant engagement pads in accordance with the present invention, situated on the projecting arms of a representative tree-shaking device.

Refer first to FIG. 1, which shows a pair of arms 10a, 10b, that extend from the oscillation units of a conventional tree-shaking apparatus (such as one of those described, for example, U.S. Pat. Nos. 4,921,073, 3,338,040, 5,469,695 and 5,473,875, the entire disclosures of all of these documents being incorporated by reference). The arms terminate in engagement assemblies 12, 14, which embody the present invention and are described in detail below. These members engage opposite (or nearly so) sides of a tree, shown in phantom, and transmit vibrations that shake the tree from side to side. A source 16 of lubricant conducts lubricant to and from engagement assemblies 12, 14 through a pair of conduits. Preferably, source 16 is an externally controllable hydraulic cylinder and piston arrangement that responds to signals provided by a user-operated controller 18.

Figure 2:
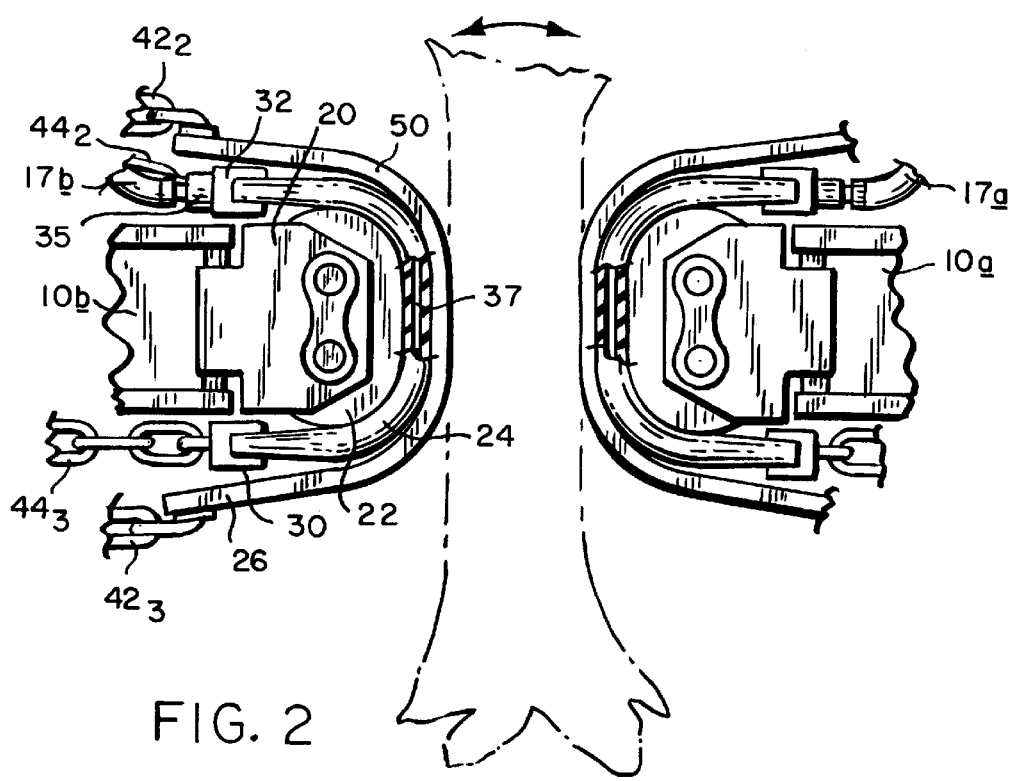
FIG. 2 is a partial cutaway end view of the arrangement shown in FIG. 1.

The details of the present invention are shown with greater particularity in FIG. 2. With reference to the assembly 12 depicted on the left, shaker arm 10b terminates in a sturdy metal shoulder 20. A series of resilient members in accordance with the present invention cushion the end face of shoulder 20, which would otherwise make direct contact with the tree.

The first resilient member is a shaker pad 22, of generally ovoid or cylindrical shape, which is secured to shoulder 20 so as to surround its end face. The end face of shaker pad 22, in turn, is surrounded by a fillable pouch 24, which is capable of containing a variable amount of a liquid lubricant; and the end face of pouch 24 is itself surrounded by a resilient blanket 26, whose outer face makes contact with the tree. Blanket 26 is optional but desirable to protect pouch 24. Preferably, pad 22, pouch 24 and blanket 26 are made of a sturdy elastomeric material such as vulcanized rubber.

Pouch 24 is configured to receive a variable amount of a liquid lubricant from cylinder 16. If substantial quantities of lubricant are to remain in pouch 24, it may be constructed to ensure that lubricant will not leak despite the considerable forces of compression that attend tree shaking. The ends of pouch 24 are each received in a sturdy metal clip 30, 32. The upper clip 32 has in an entry port 35 in fluid communication with the interior 37 of pouch 24. Conduit 17b is connected to entry port 35 and conducts liquid lubricant from cylinder 16 into pouch 24. Entry port 35 may comprise a one-way check valve which, when actuated, prevents backflow of lubricant along conduit 17b.

As shown in FIG. 1, each shaker arm has a pair of upper retaining clips 40, 42 for receiving couplings that retain pouch 24 and blanket 26; a similar pair of retaining clips, not shown, is located on the underside of each shaker arm. Preferably, pouch 24 and blanket 26 are coupled to shaker arms 10a, 10b in a flexible manner that accommodates some movement of the pouch and blanket relative to the shaker arms. In the illustrated embodiment, these couplings comprise a pair of chains $42_1$, $42_2$ that retain the top edge of blanket 26, and a pair of chains $44_1$, $44_2$ that retain clip 32. As indicated in FIG. 2, similar pairs of chains are disposed on the underside of the shaker arms, with two chains (one of which is shown at $42_3$) retaining the bottom edge of blanket 26 and another pair of chains (one of which is shown at $44_3$) retaining clip 30.

During operation, shaker arms 10a, 10b deliver generally lateral impulses as shown by the arrow. However, even if the movement of engagement assemblies 12, 14 were absolutely perpendicular to the tree, a rigid head would nonetheless slip vertically against and thereby abrade the tree bark due to bending of the tree itself. Furthermore, in practice the movements of the shaker arms may not be perfectly lateral; instead, they may to some extent be skewed up or down relative to the axis of intended motion.

Accordingly, it is crucial to accommodate off-axis movements without significantly dissipating vibrational energy.

Preferably, the lubricant adsorbs onto the inner walls of pouch 24 and does not remain in the pouch in bulk; instead, it simply refluxes from pouch 24 during shaking, returning to its source. The inner walls of pouch 24 make contact during shaking, and the contacting pouch walls resist lateral deformation as a result of vibration; in this way, lateral movement of pad 22, which is itself massive and rigid, is transmitted efficiently to blanket 26 instead of being absorbed. Alternatively, lubricant may remain in pouch 24. In this case, it is conducted to the interior 37 of pouch 24 in a manner that substantially prevents the entry of air; since liquid is incompressible, its exclusive presence within pouch 24 renders the pouch resistant to pronounced deformation as a result of vibration. In either case, pouch 24 can accommodate a relatively modest deformation transverse to the axis of intended motion (so long as the interior walls are sufficiently lubricated to permit free relative movement). Transverse motion is also assisted by any of a variety of construction considerations, including inherent elasticity and/or a tapered form.

As indicated previously, the degree of allowed transverse deformation tolerated by the pouch may be less than the average off-axis vibration amplitude of the oscillation unit or the degree of off-axis movement caused by bending of a tree during operation. Accordingly, this tolerance is augmented by the play facilitated by the chains. It is important to stress that the necessary play arises from the flexibility of the couplings between the shaker arms and the pouch and blanket. Arrangements other than chains, such as springs, can also be used to advantage.

The inner face of blanket 26 frictionally engages the outer face of pouch 24 to encourage the pouch to deform, rather than slip, as a result of small off-axis movement. Free relative movement between the interior walls of pouch 24 is facilitated by the lubricant. Alternatively or in addition, the interior walls can be fabricated from materials having very low coefficients of friction, such as TEFLON polymer or polymers incorporating TEFLON, or the KALREZ polymer sold by E. I. duPont de Nemours & Co., Wilmington, Del.; these materials can be allowed to rub against one another directly or with the aid of a minimal amount of lubricant.

Figure 3:
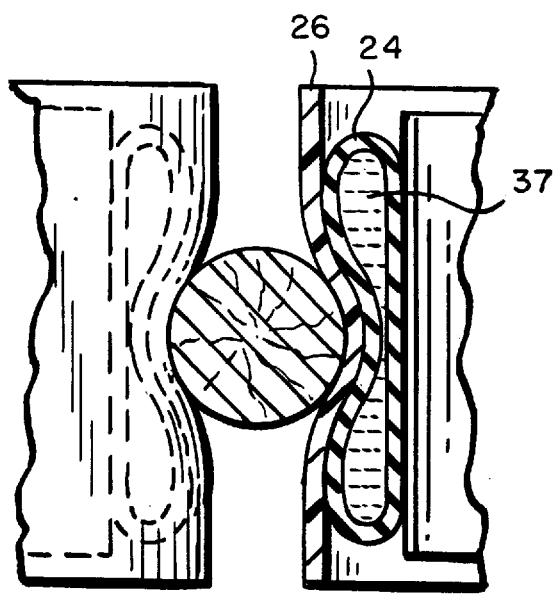
FIG. 3 is a top view of the arrangement shown in FIG. 2.

In a first mode of operation, controller 18 causes the pouches to be filled with lubricant during an idle period, such as when the shaking apparatus is moving between trees. Little pressure is required to draw lubricant from cylinder 16; gravity in combination with exhaust or manifold pressure from the shaker drive engine is ordinarily sufficient, although a dedicated pump (not shown) can instead be utilized. The user then positions shaker arms 10a, 10b on opposite sides of the tree and brings them into contact with the bark. With no substantial hydraulic pressure exerted within conduits 17a, 17b, lubricant is squeezed out of the interior 37 of pouch 24, as shown in FIG. 3, as the shaker arms grip the tree. The interior walls, however, have been sufficiently lubricated to permit their free movement relative to one another. Following shaking, lubricant is again introduced into the pouch, and allowed to be forced therefrom during the next use.

In a second, alternative mode of operation, the manner in which the lubricant is introduced into pouch 24 facilitates convenient attainment of a desired degree of contact force against the tree, thereby ensuring adequate (but not excessive) frictional engagement between the outer face 50 of blanket 26 and the tree. In this approach, the operator brings the shaker arms proximate to the tree so that each blanket 26 is adjacent to or in light contact with the bark. The operator then operates controller 18 to cause lubricant to be pumped into the interior 37 of pouch 24 until the desired contact force is achieved through expansion of the volume of pouch 24. Closing of the check valve prevents lubricant from escaping as the tree is shaken. Controller 18 can be configured to ensure that a minimum amount of liquid is introduced into the pouch to ensure ease of movement between interior surfaces; if the minimum amount of fluid cannot be introduced without exceeding the desired contact force, the operator is notified to withdraw the shaker arms slightly from the tree.

Suitable lubricants are liquids such as oil (e.g., hydraulic oil) or soap that can be conviently pumped to and from pouch 24 without clogging the various fittings and conduits, and which can withstand thermal stresses.

It will therefore be seen that the foregoing represents a highly advantageous design for tree-shaker engagement members. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A compliant engagement member for use with tree-shaking apparatus, the member comprising:
    a. a pouch for containing a variable amount of a liquid lubricant;
    b. means for conducting a variable amount of liquid lubricant to and from the pouch; and
    c. means for coupling the pouch to the tree-shaking apparatus.

2. The engagement member of claim 1 further comprising a blanket surrounding at least part of the pouch for frictionally engaging the pouch and a tree.

3. Tree-shaking apparatus comprising:
    a. a pouch for containing a variable amount of a liquid lubricant;
    b. means for conducting a variable amount of liquid lubricant to and from the pouch;
    c. a rigid frame including a shaker pad associated with the pouch; and
    d. means for yieldingly coupling the pouch to the frame so as to accommodate relative movement between the pouch and the frame.

4. The engagement member of claim 3 further comprising means for yieldingly coupling the blanket to the frame so as to accommodate relative movement between the blanket and the frame.

5. The apparatus of claim 3 wherein the pouch comprises two opposed edges and the coupling means is a pair of chains attached to each edge and to the frame.

6. The apparatus of claim 4 wherein the blanket comprises two opposed edges and the coupling means is a pair of chains attached to each edge and to the frame.

7. The apparatus of claim 3 wherein the pouch comprises two opposed edges and the coupling means is a spring attached to each edge and to the frame.

8. The apparatus of claim 4 wherein the blanket comprises two opposed edges and the coupling means is a spring attached to each edge and to the frame.

9. The engagement member of claim 1 wherein the liquid is oil and the conducting means comprises a controllable hydraulic piston.

10. The engagement member of claim 2 wherein the pouch and blanket are made of rubber.

11. The engagement member of claim 3 further comprising a vibration unit coupled to the frame.

12. A method of shaking a tree to harvest material therefrom, the method comprising:
    a. providing a pouch for containing a variable amount of a liquid lubricant;
    b. introducing a variable amount of liquid lubricant into the pouch;
    c. forcing the pouch against the tree, thereby forcing lubricant out of the pouch;
    d. shaking the tree; and
    e. withdrawing the pouch from the tree.

13. The method of claim 12 further comprising the step of reintroducing lubricant into the pouch before shaking another tree.

14. The method of claim 12 wherein the pouch has interior surfaces and sufficient lubricant remains in the pouch during shaking to permit the interior surfaces of the pouch to undergo relative movement.

15. The method of claim 12 further comprising the step of surrounding at least part of the pouch with a blanket to provide frictional engagment between the pouch and the tree, the blanket providing contact between the pouch and the tree.

16. The method of claim 12 further comprising the steps of:
    a. providing a rigid frame through which force is applied to the pouch;
    b. yieldingly coupling the pouch to the frame so as to accommodate relative movement between the pouch and the frame.

17. The method of claim 15 further comprising the steps of:
    a. providing a rigid frame through which force is applied to the pouch;
    b. yieldingly coupling the pouch and the blanket to the frame so as to accommodate relative movement between (i) the frame and (ii) the pouch and the blanket.

18. A method of shaking a tree to harvest material therefrom, the method comprising:
    a. providing a pouch for containing a variable amount of a liquid lubricant, the pouch having an interior volume and an exterior dimension, the amount of lubricant in the interior volume determining the exterior dimension;
    b. locating the pouch proximate to the tree;
    c. introducing liquid lubricant into the pouch so as to expand an exterior dimension of the pouch and thereby provide contact between the pouch and the tree;
    d. applying force to the pouch so as to shake the tree; and
    e. withdrawing the pouch from the tree.

19. The method of claim 18 wherein the pouch has interior surfaces and further comprising the step of introducing a sufficient amount of liquid lubricant into the pouch to maintain contact between the pouch and the tree as the tree is being shaken, the lubricant permitting the interior surfaces of the pouch to undergo relative movement.

20. The method of claim 18 further comprising the step of preventing liquid lubricant from escaping from the pouch as the tree is being shaken.

21. The method of claim 18 further comprising the step of surrounding at least part of the pouch with a blanket to provide frictional engagment between the pouch and the tree, the blanket providing contact between the pouch and the tree.

22. The method of claim 18 further comprising the steps of:
    a. providing a rigid frame through which force is applied to the pouch;
    b. yieldingly coupling the pouch to the frame so as to accommodate relative movement between the pouch and the frame.

23. The method of claim 21 further comprising the steps of:
    a. providing a rigid frame through which force is applied to the pouch;
    b. yieldingly coupling the pouch and the blanket to the frame so as to accommodate relative movement between (i) the frame and (ii) the pouch and the blanket.

* * * * *